US005943146A

United States Patent [19]
Harano

[11] Patent Number: 5,943,146
[45] Date of Patent: Aug. 24, 1999

[54] OPTICAL TRANSMISSION SYSTEM IN WHICH NO ARRIVAL OF A FIRST LIGHT SIGNAL IS NOTIFIED FROM A FIRST STATION TO A SECOND STATION BY AN ALARM LIGHT SIGNAL MULTIPLEXED WITH A SECOND LIGHT SIGNAL IN WAVELENGTH

[75] Inventor: Hiroshi Harano, Tokyo, Japan

[73] Assignee: NEC Corporation, Tokyo, Japan

[21] Appl. No.: 08/687,040

[22] Filed: Jul. 25, 1996

[30] Foreign Application Priority Data

Jul. 26, 1995 [JP] Japan .................................. 7-189634

[51] Int. Cl.[6] .................................................. H04B 10/08
[52] U.S. Cl. ........................... 359/110; 359/160; 370/243
[58] Field of Search .................................. 359/110, 124, 359/160, 177; 370/242, 243, 245, 246, 248

[56] References Cited

U.S. PATENT DOCUMENTS

| 4,025,737 | 5/1977 | Brewer | 370/243 |
| 5,150,243 | 9/1992 | Suzuki | 359/110 |
| 5,296,956 | 3/1994 | Fatehi et al. | 359/110 |
| 5,436,750 | 7/1995 | Kawano | 359/160 |
| 5,491,572 | 2/1996 | Ohara | 359/110 |
| 5,724,149 | 3/1998 | Stallard et al. | 359/110 |
| 5,757,526 | 5/1998 | Shiragaki et al. | 359/110 |

FOREIGN PATENT DOCUMENTS

| 3-42927 | 2/1991 | Japan | 359/110 |
| 3-94529 | 4/1991 | Japan . | |
| 3-258036 | 11/1991 | Japan | 359/110 |
| 3-258037 | 11/1991 | Japan | 359/110 |
| 4-313706 | 11/1992 | Japan . | |

Primary Examiner—Jeffery A. Hofsass
Assistant Examiner—John Tweel, Jr.
Attorney, Agent, or Firm—Sughrue, Mion, Zinn, Macpeak & Seas, PLLC

[57] ABSTRACT

In an optical transmission system including a plurality of stations, each of the stations includes a monitor/control circuit and a light signal output circuit. When the monitor/control circuit detects no arrival of a first light signal from the upstream-side station due to cutting of an optical cable or the like, a second light signal multiplexed with an alarm light signal of a predetermined wavelength is sent to the upstream-side station. The upstream-side station separates in wavelength the received multiplexed light signal so as to extract the alarm light signal therefrom and interrupts an optical output of the light signal output circuit toward the downstream-side station, i.e. a sender of the alarm light signal.

8 Claims, 3 Drawing Sheets

OPTICAL TRANSMISSION SYSTEM IN WHICH NO ARRIVAL OF A FIRST LIGHT SIGNAL IS NOTIFIED FROM A FIRST STATION TO A SECOND STATION BY AN ALARM LIGHT SIGNAL MULTIPLEXED WITH A SECOND LIGHT SIGNAL IN WAVELENGTH

BACKGROUND OF THE INVENTION

The present invention relates to an optical transmission system including relay stations and, in particular, to an optical output interrupting system for interrupting an optical output of an optical amplifier in view of safety when detachment of a connector or cutting of an optical cable occurs.

In recent years, the long-distance optical transmission can be achieved by arranging a optical amplifier, which directly amplifies a light signal in the form of light using the erbium doped fiber, In a relay station so as to amplify the light signal which has been attenuated due to transmission loss. Since an optical output amplified by the optical amplifier is very strong in light intensity, it is very dangerous if impinging upon the eye of a workman. Hence, consideration is required to the safety. In particular, when an output connector of the optical amplifier is detached or an optical cable being a transmission line is cut, an immediate interruption of the optical output is required so as to prevent the optical output from adversely affecting a human body. In view of this, an apparatus has been developed that automatically interrupts the optical output by detecting the Fresnel reflection which occurs at an end face of the fiber when the connector is detached or the optical cable is cut.

On the other hand, there has also been a system, wherein up and down optical cables are individually arranged between first and second opposite stations. When the first station detects no arrival of a light signal from the second station through, for example, the up cable due to the cable cutting or the like, the first station stops an optical output to the second station through the down cable so that the second station being a transmitter station of the up cable detects no arrival of a light signal from the first station being a receiver station of the up cable and stops sending the light signal into the up cable which is subjected to the cable cutting or the like. Thus, in this system, no arrival of the light signal should be detected twice until the optical output into the optical cable subjected to the cable cutting or the like is stopped. Accordingly, a relatively long time is required from the occurrence of the cable cutting or the like to the interruption of the optical output.

Japanese First (unexamined) Patent Publication No. H04-313706 discloses an optical output interrupting system, wherein one optical cable is used for up and down bilateral transmissions so that an optical output can be interrupted in a short time from an occurrence of the cable cutting or the like. In this system, when no arrival of the light signal is detected at each of stations arranged at opposite ends of the bilateral transmission optical cable, transmission of the light signal to the opposite station is stopped. Since no arrival of the light signal is detected at the opposite stations substantially at the same time, the optical output can be interrupted in a short time.

On the other hand, Japanese First (unexamined) Patent Publication No. H03-94529 discloses an optical output interrupting system, wherein digital data is optically transmitted in frame structure, and an abnormal state of a transmission line is detected using data at an overhead portion of a frame, and wherein an occurrence of the abnormal state is notified to an opposite station so that the optical output from the opposite station is interrupted.

However, in the system which detects the cable cutting or the like based on the Fresnel reflection, although the detachment of the output connector of the optical amplifier or the cutting of the optical cable at a position near the optical amplifier can be detected, the cable cutting at a place remote from the optical amplifier can not be detected. Further, if dust is adhered to the end face of the fiber, it is possible that an occurrence of the cable cutting can not be detected.

On the other hand, in the system where the receiver station detects no arrival of the light signal and notifies it to the transmitter station so as to interrupt the optical output, even the cable cutting at the position remote from the optical amplifier can be reliably detected. However, when no arrival of the light signal is detected, the receiver station notifies it to the opposite station by stopping the optical output to the opposite station. Thus, even if the up and down optical cables are individually arranged, the cutting of one of the cables renders the communication in both directions impossible. On the other hand, in the system where one optical cable is used for the up and down bilateral transmissions, although no notification is performed, the up and down communications are both disabled at once.

When using the data at the overhead portion, the communication in a direction not subjected to the cable cutting can be ensured. However, it is not preferable to control the overhead portion data at the relay station in the long-distance optical transmission system since this lowers the flexibility or generality of the communication system. Further, there is another problem that a complicated apparatus should be provided per relay station for analyzing the frame to control the overhead portion data.

SUMMARY OF THE INVENTION

It is therefore an object of the present invention to provide an optical transmission system in which no arrival of a first light signal is notified from a first station to a second station by an alarm light signal multiplexed with a second light signal in wavelength.

It is another object of the present invention to provide an optical transmission system of the type described, which has an optical output interrupting function suitable for a long-distance optical transmission system including at least one relay station.

Other objects of this invention will become clear as the description proceeds.

According to an aspect of the present invention, there is provided an optical transmission system comprising a first station, a second station, a first optical cable connected between the first and the second stations for transmitting a first light signal from the second station to the first station, and a second optical cable connected between the first and the second stations for transmitting a second light signal from the first station to the second station. The first station comprises no-input-arrival detecting means connected to the first optical cable for detecting no arrival of the first light signal via the first optical cable, alarm light signal producing means connected to the no-input-arraival detecting means for producing an alarm light signal having a predetermined optical wavelength when no arrival of the first light signal is detected by the no-input-arrival detection means, and wavelength multiplexing means connected to the second optical cable and the alarm light signal producing means for multiplexing in wavelength the alarm light signal with the second light signal to produce a multiplexed light signal which is supplied to the second optical cable. The second station comprises alarm light signal separating means connected to the second cable for separating in wavelength the alarm light signal from the second light signal in response to the multiplexed light signal, a optical amplifier connected to the first optical cable for supplying the first light signal to the first optical cable, and light output interrupting means connected to the alarm light signal separating means and the optical amplifier and responsive to the alarm light signal for interrupting the optical amplifier to supply the first light signal to the first optical cable.

It may be arranged that the optical amplifier is of a type which directly amplifies the first light signal in the form of light using rare earth element added fiber as an amplifying medium.

It may be arranged that the no-input-arrival detecting means comprises a photodiode connected to the first optical cable for detecting the first light signal to produce an electric signal, and a signal detection circuit connected to the photodiode and the alarm light signal producing means for detecting absence of the electric signal to produce a no-arrival detection signal. The alarm light signal producing means produces the alarm light signal in response to the no-arrival detection signal.

It may be arranged that the light output interrupting means comprises a photodiode connected to the alarm light signal separating means for detecting the alarm light signal to produce an electric signal, an alarm detection circuit connected to the photodiode for detecting the electric signal to produce an interruption demand signal, and an output control circuit connected to the alarm detection circuit and the optical amplifier for controlling operation of the optical amplifier to interrupt the supply of the first light signal to the first optical cable in response to the interruption demand signal.

According to another aspect of the present invention, there is provided an optical transmission system comprising first and second transmitter/receiver stations each of which includes light signal outputting means for outputting a light signal, light signal receiving means for receiving a light signal, no-input-arrival detection means for detecting no arrival of the light signal to be inputted to the light signal receiving means, alarm light signal output means for outputting an alarm light signal having a given optical wavelength when no arrival of the light signal is detected by the no-input-arrival detection means, wavelength multiplexing means for multiplexing in wavelength the alarm light signal with the light signal outputted from the light signal outputting means, alarm light signal extracting means for separating in wavelength the light signal inputted to the light signal receiving means so as to extract the alarm light signal therefrom, and optical output interrupting means for interrupting the light signal to be outputted from the light signal outputting means when the alarm light signal is extracted by the alarm light signal extracting means. The optical transmission system further comprises at least one relay station arranged between the first and second transmitter/receiver stations. The at least one relay station includes a first optical amplifier for amplifying the light signal sent from a first adjacent station and outputting the amplified light signal to a second adjacent station, a second optical amplifier for amplifying the light signal sent from the second adjacent station and outputting the amplified light signal to the first adjacent station, first no-arrival detection means for detecting no arrival of the light signal sent from the first adjacent station, second no-arrival detection means for detecting no arrival of the light signal sent from the second adjacent station, first alarm light signal output means for outputting an alarm light signal having a given optical wavelength when no arrival of the light signal is detected by the first no-arrival detection means, second alarm light signal output means for outputting an alarm light signal having a given optical wavelength when no arrival of the light signal is detected by the second no-arrival detection means, first wavelength multiplexing means for multiplexing in wavelength the alarm light signal outputted from the first alarm light signal output means with the amplified light signal outputted from the second optical amplifier, second wavelength multiplexing means for multiplexing in wavelength the alarm light signal outputted from the second alarm light signal output means with the amplified light signal outputted from the first optical amplifier, first alarm signal extracting means for separating in wavelength the light signal sent from the first adjacent station so as to extract the alarm light signal therefrom, second alarm signal extracting means for separating in wavelength the light signal sent from the second adjacent station so as to extract the alarm light signal therefrom, first optical output interrupting means for interrupting the amplified light signal to be outputted from the first optical amplifier when the alarm light signal is extracted by the second alarm signal extracting means, and second optical output interrupting means for interrupting the amplified light signal to be outputted from the second optical amplifier when the alarm light signal is extracted by the first alarm signal extracting means. The optical transmission system further comprises up and down optical cables individually provided among the first transmitter/receiver station, the at least one relay station and the second transmitter/receiver station.

It may be arranged that each of the first and second optical amplifiers is of a type which directly amplifies the light signal in the form of light using rare earth element added fiber as an amplifying medium.

According to this invention, there is provided a station included in an optical transmission system comprising the station, a counterpart station, a first optical cable connected between the first-mentioned and the counterpart stations for transmitting a first light signal from the counterpart station to the first-mentioned station, and a second optical cable connected between the first-mentioned and the counterpart stations for transmitting a second light signal from the first-mentioned station to the counterpart station. The first-mentioned station comprises no-input-arrival detecting means connected to the first optical cable for detecting no arrival of the first light signal via the first optical cable, alarm light signal producing means connected to the no-input-arrival detecting means for producing an alarm light signal having a predetermined optical wavelength when no arrival of the first light signal is detected by the no-input-arrival detection means, and wavelength multiplexing means connected to the second optical cable and the alarm light signal producing means for multiplexing in wavelength the alarm light signal with the second light signal to produce a multiplexed light signal which is supplied to the second optical cable.

According to this invention, there is provided with a station included in an optical transmission system comprising the station, a counterpart station, a first optical cable connected between the first-mentioned and the counterpart stations for transmitting a first light signal from the first-mentioned station to the counterpart station, and a second optical cable connected between the first-mentioned and the counterpart stations for transmitting a second light signal from the counterpart station to the first-mentioned station. The counterpart station multiplexes in wavelength an alarm light signal with the second light signal in response to no arrival of the first light signal to produce a multiplexed light signal and to supply the multiplexed light signal to the second optical cable. The first-mentioned station comprises alarm light signal separating means connected to the second cable for separating in wavelength the alarm light signal from the second light signal in response to the multiplexed light signal, an optical amplifier connected to the first optical cable for supplying the first light signal to the first optical cable, and light output interrupting means connected to the alarm light signal separating means and the optical amplifier and responsive to the alarm light signal for interrupting the optical amplifier to supply the first light signal to the first optical cable

DESCRIPTION OF THE PREFERRED EMBODIMENT

Figure 1:
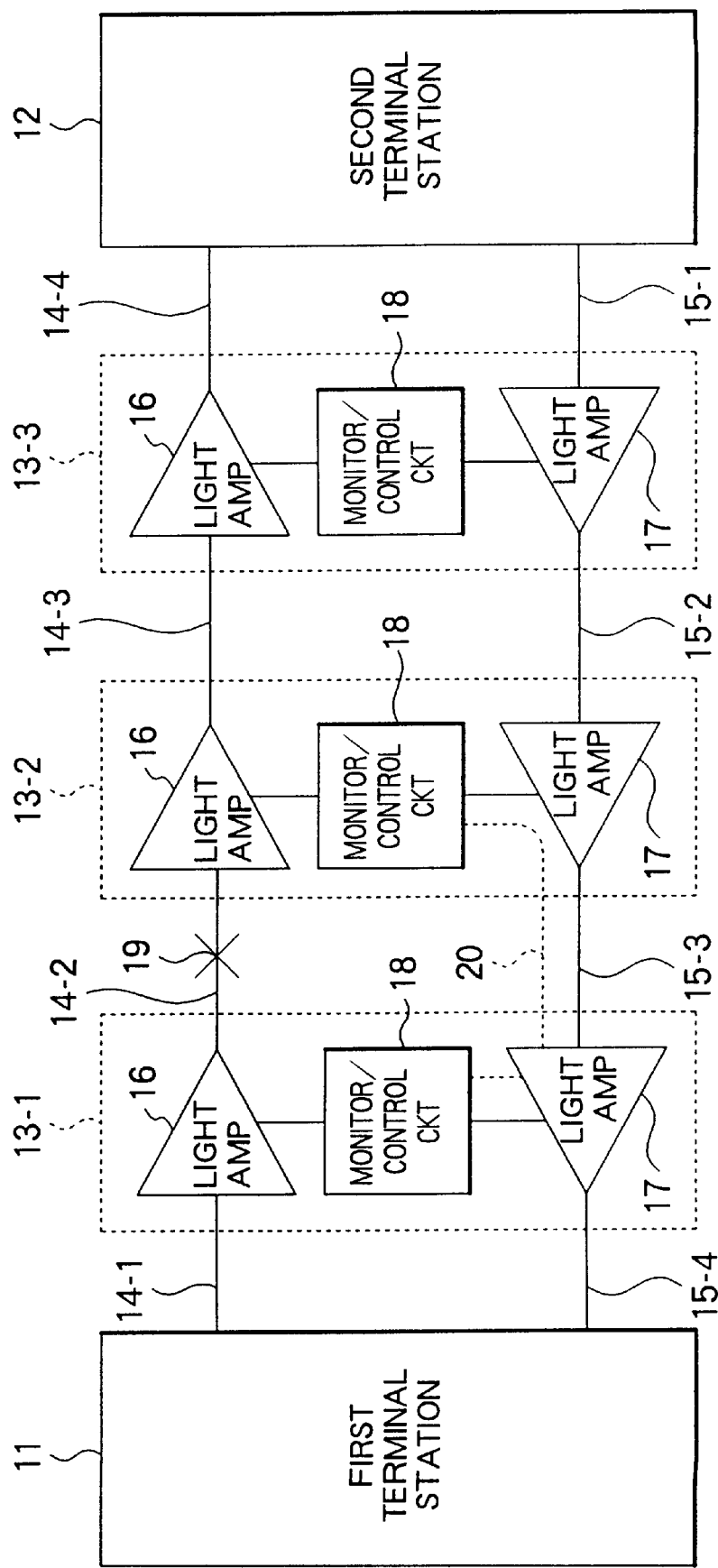
FIG. 1 is a block diagram of an optical transmission system according to an embodiment of this invention.

Referring to FIG. 1, description will be made as regards an optical transmission system according to an embodiment of the present invention. The optical transmission system has an optical output interrupting function which will far later become clear.

In FIG. 1, between first and second terminal stations 11 and 12 are arranged first to third relay stations 13-1 to 13-3. Among them, up optical cables 14-1 to 14-4 and down optical cables 15-1 to 15-4 are connected. Each of the terminal stations 11 and 12 has a function to convert data to be sent to the opposite terminal station into a light signal and transmit it and another function to receive the light signal transmitted from the opposite terminal station via the relay stations. Each of the relay stations 13-1 to 13-3 has a function to amplify the light signal attenuated due to transmission loss through the optical cables and send it to the next station.

At each relay station, a optical amplifier 16 for amplifying a light signal of the up cable and a optical amplifier 17 for amplifying a light signal of the down cable are provided. Each of the optical amplifiers 16 and 17 is of a type which directly amplifies a light signal in the form of light using the erbium doped fiber. Each relay station further includes a monitor/control circuit 18 having a function to detect no arrival of the input light signal and notify it to the upstream-side station. Upon detection of no arrival of the input light signal, each of the relay stations 13-1 to 13-3 and the first and second terminal stations 11 and 12 sends an alarm light signal indicative of the detection of no arrival of the input to the upstream-side station. The station in receipt of the alarm light signal interrupts transmission of the light signal to the transmitter station of the alarm light signal. For example, when cutting occurs at a position 19 identified by an X mark on the optical cable 14-2, the second relay station 13-2 detects it and sends an alarm light signal 20 to the first relay station 13-1. In response to this, the first relay station 13-1 stops transmission of the light signal to the second relay station 13-2.

Figure 2:
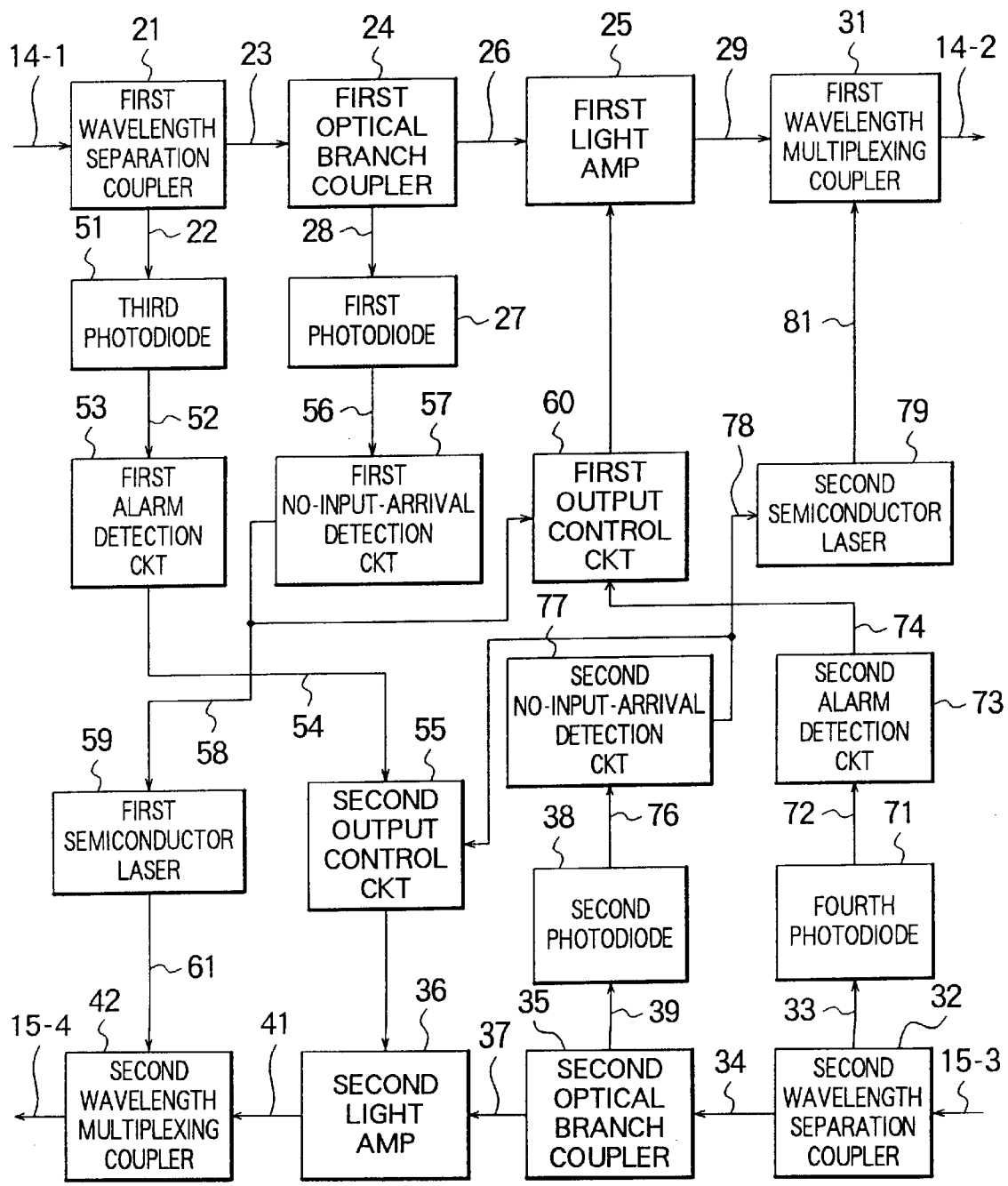
FIG. 2 is a block diagram of one of relay stations included In the optical transmission system of FIG. 1.

Turning to FIG. 2, the description will be directed to the first through the third relay stations 13-1 to 13-3 included in the optical transmission system shown In FIG. 1. Since the structures of the first to third relay stations are identical with each other, only the first relay station 13-1 will be explained herein-below.

The up optical cable 14-1 is connected to a first wavelength separation coupler 21. The first wavelength separation coupler 21 is an optical circuit element which separates a light signal inputted through the optical cable 14-1, depending on an optical wavelength thereof, into an alarm light signal 22 and a light signal 23 having a wavelength other than that of the alarm light signal 22, and outputs them. The light signal 23 after separation is inputted to a first optical branch coupler 24 so as to be branched into an input light 26 for a first optical amplifier 25 and an input light 28 for a first photodiode 27. An output light 29 of the first optical amplifier 25 is inputted to a first wavelength multiplexing coupler 31. Similarly, a light signal sent through the down optical cable 15-3 is inputted to a second wavelength separation coupler 32. The second wavelength separation coupler 32 separates the inputted light signal into an alarm light signal 33 and a light signal 34 having a wavelength other than that of the alarm light signal 33. The light signal 34 after separation is inputted to a second optical branch coupler 35 so as to be branched into an input light .37 for a second optical amplifier 36 and an input light 39 for a second photodiode 38. An output light 41 of the second optical amplifier 36 is inputted to a second wavelength multiplexing coupler 42.

The alarm light signal 22 separated by the first wavelength separation coupler 21 is received by a third photodiode 51 and converted into an electric signal 52. Thus, the electric signal 52 is outputted in response to presence of the alarm light signal 22. The electric signal 52 is input to a first alarm detection circuit 53. The first alarm detection circuit 53 monitors presence or absence of the input electric signal 52 so as to output a given optical output interruption demand signal 54 to a second output control circuit 55 upon detection of the electric signal .52. The second output control circuit 55 controls the gain of the second optical amplifier 36 and stops an amplifying operation of the second optical amplifier 36 so as to interrupt the optical output thereof when the optical output interruption demand signal 54 is inputted.

The first photodiode 27 outputs an electric signal 56 depending on the light intensity of the output light 28 of the first optical branch coupler 24. The electric signal 56 outputted from the first photodiode 27 is inputted to a first no-input-arrival detection circuit 57. The first no-input-arrival detection circuit 57 monitors the electric signal 56 so as to detect no arrival of the light signal inputted through the optical cable 14-1. The first no-input-arrival detection circuit 57 outputs a no-arrival detection signal 58 upon detection of no arrival of the light signal. The no-arrival detection signal 58 is inputted to a first semiconductor laser 59 and a first output control circuit 60.

While the no-arrival detection signal 58 is inputted, the first semiconductor laser 59 outputs an alarm light signal 61. The wavelength of the alarm light signal 61 is set to a value which is different from wavelengths of the main signal for transmitting various data between the terminal stations. The second wavelength multiplexing coupler 42 multiplexes in wavelength the output light 41 of the second optical amplifier 36 and the output light 61 of the first semiconductor laser 59 and outputs a multiplexed signal into the down optical cable 15-4. The first output control circuit 60 interrupts the output light of the first optical amplifier 25 when the no-arrival detection signal 58 is inputted.

The alarm light signal 33 separated by the second wavelength separation coupler 32 Is received by a fourth photodiode 71 and converted into an electric signal 72. The electric signal 72 is inputted to a second alarm detection circuit 73. The second alarm detection circuit 73 outputs a given optical output interruption demand signal 74 to the first output control circuit 60 upon detection of the electric signal 72. The first output control circuit 60 controls the gain of the first optical amplifier 25 and stops an amplifying operation of the first optical amplifier 25 so as to interrupt the optical output thereof when the optical output interruption demand signal 74 is inputted.

The second photodiode 38 outputs an electric signal 76 depending on the light intensity of the output light 39 of the second optical branch coupler 35. The electric signal 76 outputted from the second photodiode 38 is inputted to a second no-input-arrival detection circuit 77. The second no-input-arrival detection circuit 77 monitors the electric signal 76 so as to detect no arrival of the light signal inputted through the optical cable 15-3. The second no-input-arrival detection circuit 77 outputs a no-arrival detection signal 78 upon detection of no arrival of the light signal. The no-arrival detection signal 78 is inputted to a second semiconductor laser 79 and the second output control circuit 55.

While the no-arrival detection signal 78 is inputted, the second semiconductor laser 79 outputs an alarm light signal 81. The first wavelength multiplexing coupler 31 multiplexes in wavelength the alarm light signal 81 and the output light 29 of the first optical amplifier 25 and outputs a multiplexed signal into the up optical cable 14-2. The second output control circuit 55 interrupts the output light of the second optical amplifier 36 when the no-arrival detection signal 78 is inputted.

Figure 3:
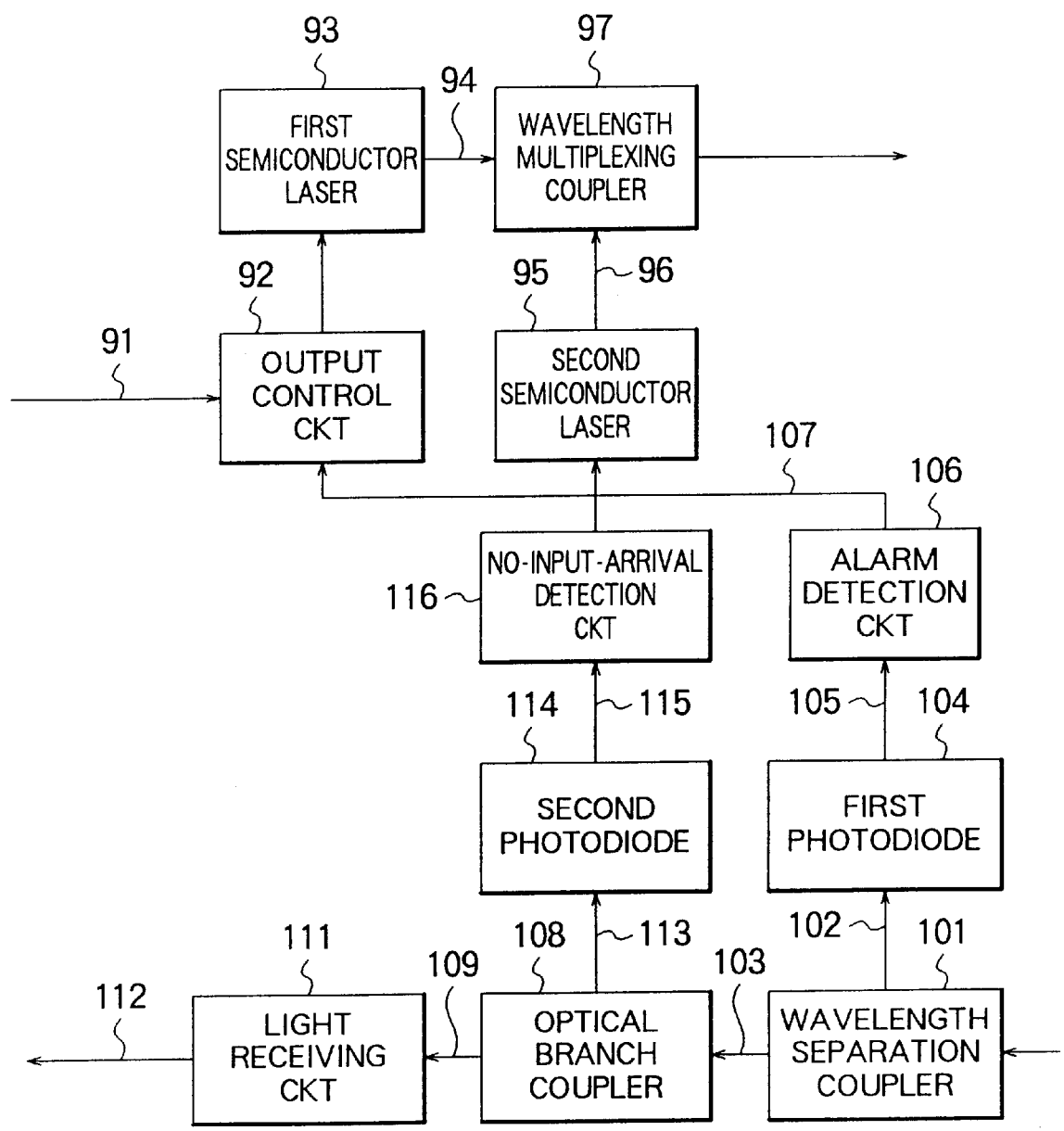
FIG. 3 is a block diagram of one of two terminal station included in the optical transmission system of FIG. 1.

Turning to FIG. 3, the description will be directed to each of the first and second terminal stations 11 and 12 included in the optical transmission system shown in FIG. 1. An input signal 91 indicative of data to be transmitted is inputted to an output control circuit 92 The output control circuit 92 controls an optical output of a first semiconductor laser 93 depending on the input signal 91. An output light 94 of the first semiconductor laser 93 and an alarm light signal 96 of a second semiconductor laser 95 are inputted to a wavelength multiplexing coupler 97 which multiplexes them in wavelength. An output light of the wavelength multiplexing coupler 97 is transmitted to the opposite relay station via the optical cable.

A wavelength separation coupler 101 is inputted with the light signal sent from the opposite relay station. The wavelength separation coupler 101 separates in wavelength the inputted light signal into an alarm light signal 102 and a light signal 103 having a wavelength other than that of the alarm light signal 102. The alarm light signal 102 is inputted to a first photodiode 104 so as to be converted into an electric signal 105. Thus, the electric signal 105 is outputted in response to presence of the alarm light signal 102. An alarm detection circuit 106 detects based on the electric signal 105 whether the alarm light signal is sent from the opposite relay station. The alarm detection circuit 106 outputs an optical output interruption demand signal 107 upon detection of the electric signal 105, that is, upon detection of the alarm light signal sent from the opposite relay station. The optical output interruption demand signal 107 is inputted to the output control circuit 92. In response to the optical output interruption demand signal 107, the output control circuit 92 stops an operation of the first semiconductor laser 93.

The light signal 103 separated in wavelength by the wavelength separation coupler 101 is inputted to an optical branch coupler 108. A branched light signal 109 is inputted to a light receiving circuit 111. The light receiving circuit 111 outputs an electric signal 112 depending on the intensity of the inputted light signal. Another branched light signal 113 is inputted to a second photodiode 114. An electric signal 115 outputted from the second photodiode 114 is inputted to a no-input-arrival detection circuit 116. Based on the electric signal 115, the no-input-arrival detection circuit 116 detects no arrival of the light signal sent from the opposite relay station. Upon detection of no arrival of the light signal, the no-input-arrival detection circuit 116 outputs a no-arrival detection signal 117 to the second semiconductor laser 95. When the no-arrival detection signal 117 is inputted, the second semiconductor laser 95 emits light so as to output the alarm light signal 96.

Now, the description will be made as regards the optical output interrupting function upon an occurrence of cutting of the optical cable or detachment of the connector.

In FIG. 1, it is assumed that the cutting has occurred at the optical cable 14-2 between the first and second relay stations. Due to the cutting of the optical cable 14-2, no light signal reaches the second relay station 13-2. Thus, the first no-input-arrival detection circuit 57 (FIG. 2) of the second relay station 13-2 detects no arrival of the light signal from the first relay station 13-1 and outputs the no-arrival detection signal 58 to the first semiconductor laser 59. In response to this, the first semiconductor laser 59 outputs the alarm light signal 61. The alarm light signal 61 is multiplexed in wavelength with the light signal from the third relay station 13-3 at the second wavelength multiplexing coupler 42. The output light of the second wavelength multiplexing coupler 42 is sent to the first relay station 13-1 via the optical cable 15-4. Further, in response to the no-arrival detection signal 58, the first output control circuit 60 stops the operation of the first optical amplifier 25 so that the optical output to the third relay station 13-3 is interrupted.

The second alarm detection circuit 73 of the first relay station 13-1 detects that the alarm light signal is contained in the light signal sent from the second relay station 13-2, and outputs the optical output interruption demand signal 74. In response to this, the first output control circuit 60 stops the operation of the first optical amplifier 25 so that the optical output toward the second relay station 13-2 is interrupted. When no arrival of the input from the first relay station 13-1 is detected at the second relay station 13-2, transmission of the light signal toward the third relay station 13-3 has been stopped at the second relay station 13-2. Thus, no arrival of the light signal is also detected at the third relay station 13-3. In this fashion, when the cable cutting occurs at the upstream-side of the transmission line, transmission of the light signals is stopped in all the downstream-side stations. This prevents transmission of the meaningless signal to the downstream-side terminal station and further enables the downstream-side terminal station to recognize an occurrence of the abnormal state, such as the cutting, in the transmission line.

When the cable cutting or the like occurs at the down optical cable 15, the system operates in the manner similar to the foregoing.

On the other hand, if the cutting occurs at the up optical cable 14-4 between the third relay station 13-3 and the second terminal station 12, the no-input-arrival detection circuit 116 of the second terminal station 12 detects no arrival of the input light so that the light signal multiplexed in wavelength with the alarm light signal is sent to the third relay station 13-3. Since the second terminal station 12 has no next-stage station, no operation is performed for stopping the optical output toward the next-stage station. The third relay station 13-3 detects the alarm light signal sent from the second terminal station 12 and stops transmission of the light signal toward the second terminal station 12

On the other hand, If the cutting occurs at the down optical cable 15-1 between the second terminal station 12 and the third relay station 13-3, the third relay station 13-3 detects no arrival of the input light and sends the alarm light signal to the second terminal station 12 via the optical cable 14-4 The second terminal station 12 detects the alarm light signal and stops transmission of the light signal toward the third relay station 13-3.

As appreciated, when the cable cutting occurs between the first terminal station 11 and the first relay station 13-1, the optical output is interrupted in the manner similar to the foregoing.

As described above, according to the preferred embodiment of the present invention, since the alarm light signal is multiplexed in wavelength with the light signal indicative of the data to be transmitted, no arrival of the light signal can be notified to the upstream-side station without controlling the data indicative light signal itself. Further, since transmission of the light signal toward the downstream-side station is interrupted upon detection of no arrival of the input light, unnecessary light signal transmission toward the downstream-side station can be avoided. Further, in the foregoing preferred embodiment, each of the opposite terminal stations and the relay stations arranged therebetween has a function to detect no arrival of the input light and send the alarm light signal to the upstream-side station and a function to stop transmission of the light signal toward the downstream-side station upon receipt of the alarm light signal. With this arrangement, the reliable safety measure relative to the cable cutting or the like can be ensured in the long-distance optical transmission system.

Further, as appreciated, since the optical amplifier is of the type whose gain is large to achieve the high light intensity after amplification, the foregoing reliable safety measure is particularly useful.

While the present invention has been described in terms of the preferred embodiment, the invention is not to be limited thereto, but can be embodied in various ways without departing from the principle of the invention as defined in the appended claims.

What is claimed is:

1. An optical transmission system comprising:
    a first station;
    a second station;
    a first optical cable connected between said first station and said second station for transmitting a first light signal from said second station to said first station; and
    a second optical cable connected between said first and said second stations for transmitting a second light signal from said first station to said second station;
    said first station comprising:
        no-input-arrival detecting means connected to said first optical cable for detecting no arrival of said first light signal via said first optical cable;
        alarm light signal producing means connected to said no-input-arrival detecting means for producing an alarm light signal having a predetermined optical wavelength when no arrival of said first light signal is detected by said no-input-arrival detection means; and
        wavelength multiplexing means connected to said second optical cable and said alarm signal producing means for multiplexing said alarm light signal with said second light signal to produce a multiplexed light signal which is supplied to said second optical cable;
    said second station comprising:
        alarm light signal separating means connected to said second optical cable for separating said alarm light signal from said second light signal in response to said multiplexed light signal;
        an optical amplifier connected to said first optical cable for supplying said first light signal to said first optical cable; and
        light output interrupting means connected to said alarm light signal separating means and said optical amplifier and responsive to said alarm light signal for interrupting said optical amplifier to supply said first light signal to said first optical cable.

2. An optical transmission system as claimed in claim 1, wherein said optical amplifier is of a type which directly amplifies said first light signal in the form of light using rare earth element added fiber as an amplifying medium.

3. An optical transmission system as claimed in claim 1, wherein said no-input-arrival detecting means comprises:
    a photodiode connected to said first optical cable for detecting said first light signal to produce an electric signal; and
    a signal detection circuit connected to said photodiode and said alarm light signal producing means for detecting absence of said electric signal to produce a no-arrival detection signal, said said alarm light signal producing means producing said alarm light signal in response to said no-arrival detection signal.

4. An optical transmission system as claimed in claim 1, wherein said light output interrupting means comprises:
    a photodiode connected to said alarm light signal separating means for detecting said alarm light signal to produce an electric signal;
    an alarm detection circuit connected to said photodiode for detecting said electric signal to produce an interruption demand signal; and
    an output control circuit connected to said alarm detection circuit and said optical amplifier for controlling operation of said optical amplifier to interrupt the supply of said first light signal to said first optical cable in response to said interruption demand signal.

5. An optical transmission system comprising:
    first and second transmitter/receiver stations each of which includes light signal outputting means for outputting a light signal, light signal receiving means for receiving a light signal, no-input-arrival detection means for detecting no arrival of the light signal to be inputted to said light signal receiving means, alarm light signal output means for outputting an alarm light signal having a given optical wavelength when no arrival of said light signal is detected by said no-input-arrival detection means, wavelength multiplexing means for multiplexing in wavelength said alarm light signal with the light signal outputted from said light signal outputting means, alarm light signal extracting means for separating in wavelength the light signal inputted to said light signal receiving means so as to extract the alarm light signal therefrom, and optical output interrupting means for interrupting the light signal to be outputted from said light signal outputting means when said alarm light signal is extracted by said alarm light signal extracting means;

at least one relay station arranged between said first and second transmitter/receiver stations, said at least one relay station including a first optical amplifier for amplifying the light signal sent from a first adjacent station and outputting the amplified light signal to a second adjacent station, a second optical amplifier for amplifying the light signal sent from said second adjacent station and outputting the amplified light signal to said first adjacent station, first no-arrival detection means for detecting no arrival of the light signal sent from said first adjacent station, second no-arrival detection means for detecting no arrival of the light signal sent from said second adjacent station, first alarm light signal output means for outputting an alarm light signal having a given optical wavelength when no arrival of the light signal is detected by said first no-arrival detection means, second alarm light signal output means for outputting an alarm light signal having a given optical wavelength when no arrival of the light signal is detected by said second no-arrival detection means, first wavelength multiplexing means for multiplexing in wavelength the alarm light signal outputted from said first alarm light signal output means with the amplified light signal outputted from said second optical amplifier, second wavelength multiplexing means for multiplexing in wavelength the alarm light signal outputted from said second alarm light signal output means with the amplified light signal outputted from said first optical amplifier, first alarm signal extracting means for separating in wavelength the light signal sent from said first adjacent station so as to extract the alarm light signal therefrom, second alarm signal extracting means for separating in wavelength the light signal sent from said second adjacent station so as to extract the alarm light signal therefrom, first optical output interrupting means for interrupting the amplified light signal to be outputted from said first optical amplifier when the alarm light signal is extracted by said second alarm signal extracting means, and second optical output interrupting means for interrupting the amplified light signal to be outputted from said second optical amplifier when the alarm light signal is extracted by said first alarm signal extracting means; and up and down optical cables individually provided among said first transmitter/receiver station, said at least one relay station and said second transmitter/receiver station.

6. An optical transmission system as claimed in claim 5, wherein each of said first and second optical amplifiers is of a type which directly amplifies said light signal in the form of light using rare earth element added fiber as an amplifying medium.

7. A station included in an optical transmission system comprising said station, a counterpart station, a first optical cable connected between the first-mentioned and said counterpart stations for transmitting a first light signal from said counterpart station to the first-mentioned station, and a second optical cable connected between the first-mentioned and said counterpart stations for transmitting a second light signal from the first-mentioned station to said counterpart station, the first-mentioned station comprising:

no-input-arrival detecting means connected to said first optical cable for detecting no arrival of said first light signal via said first optical cable;

alarm light signal producing means connected to said no-input-arrival detecting means for producing an alarm light signal having a predetermined optical wavelength when no arrival of said first light signal is detected by said no-input-arrival detection means; and wavelength multiplexing means connected to said second optical cable and said alarm light signal producing means for multiplexing in wavelength said alarm light signal with said second light signal to produce a multiplexed light signal which is supplied to said second optical cable.

8. A station included in an optical transmission system comprising said station, a counterpart station, a first optical cable connected between said station and said counterpart station for transmitting a first light signal from said station to said counterpart station, and a second optical cable connected between said station and said counterpart station for transmitting a second light signal from said counterpart station to said station, said counterpart station multiplexing an alarm light signal with said second light signal in response to no arrival of said first light signal to produce a multiplexed light signal and to supply said multiplexed light signal to said second optical cable, said station comprising:

alarm light signal separating means connected to said second optical cable for separating said alarm light signal from said second light signal in response to said multiplexed light signal;

an optical amplifier connected to said first optical cable for supplying said first light signal to said first optical cable; and light output interrupting means connected to said alarm light signal separating means and said optical amplifier and responsive to said alarm light signal for interrupting said optical amplifier to supply said first light signal to said first optical cable.

* * * * *